May 19, 1970     J. R. CRAWFORD     3,513,145

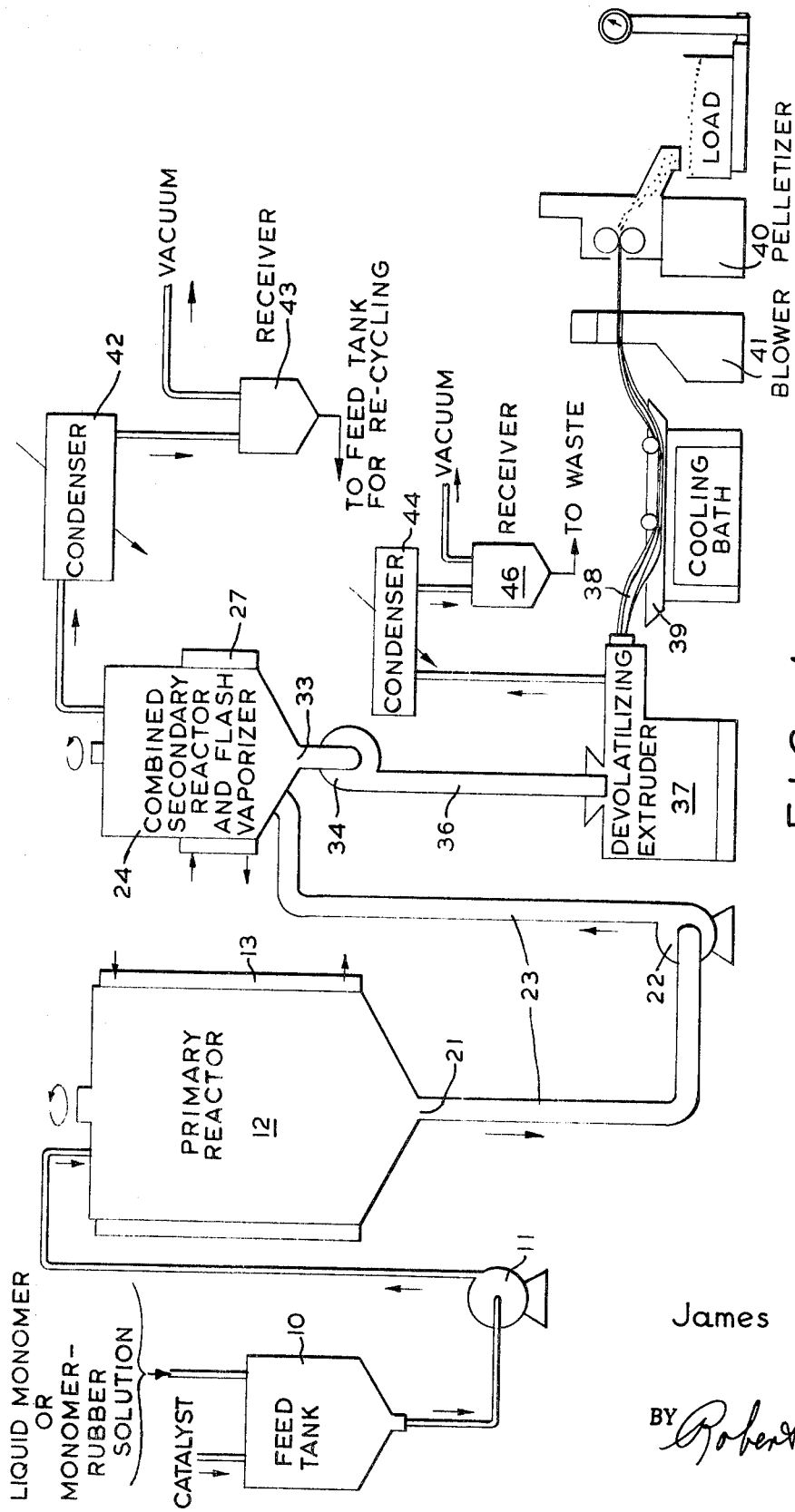

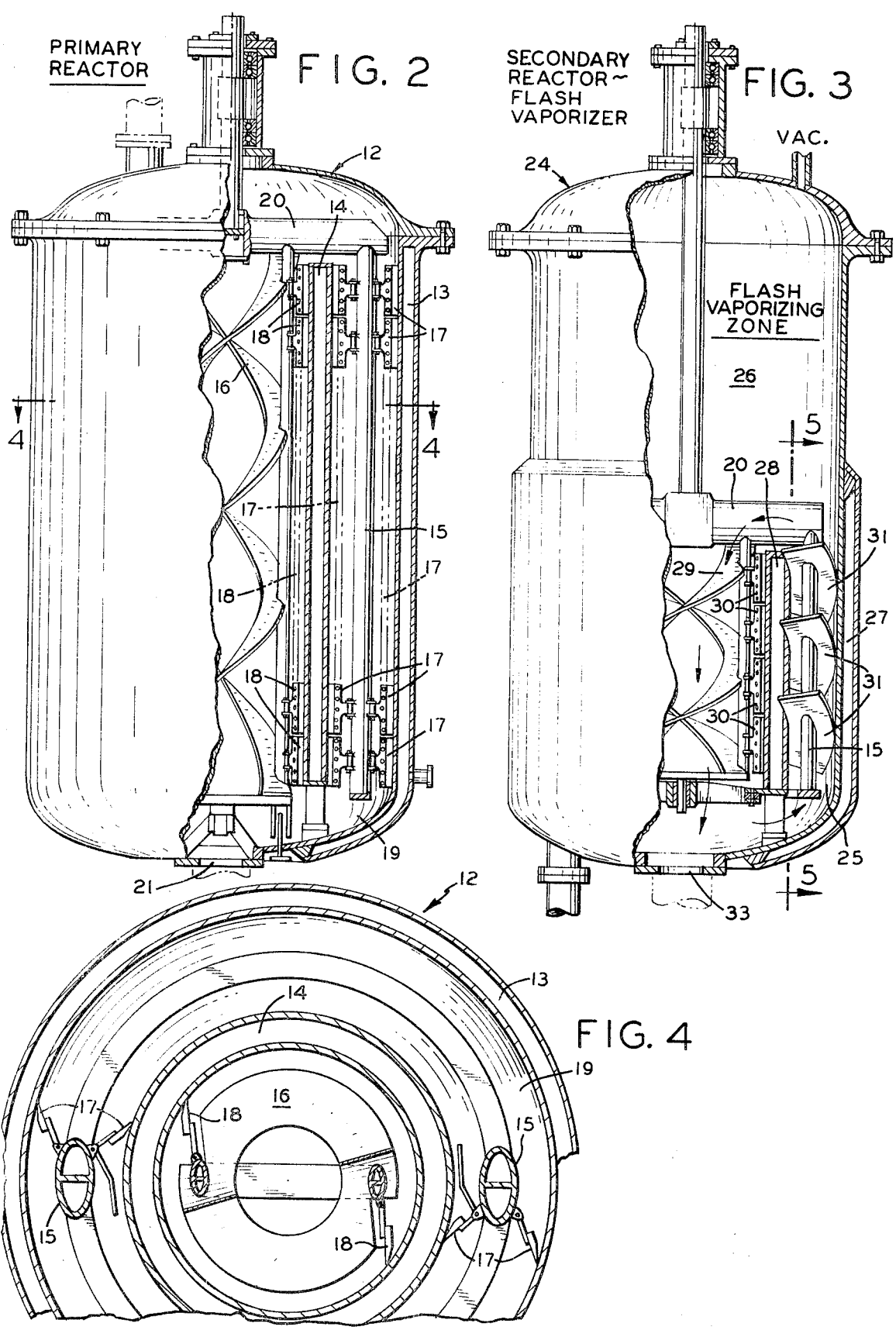

CONTINUOUS MASS POLYMERIZATION PROCESSES

Filed Feb. 25, 1966     3 Sheets-Sheet 3

United States Patent Office 3,513,145
Patented May 19, 1970

3,513,145
CONTINUOUS MASS POLYMERIZATION PROCESSES
James R. Crawford, New Canaan, Conn., assignor to Crawford & Russell Incorporated, Stamford, Conn.
Filed Feb. 25, 1966, Ser. No. 530,143
Int. Cl. C08f 7/04
U.S. Cl. 260—935    6 Claims

ABSTRACT OF THE DISCLOSURE

Continuous processes for the mass polymerization of styrene monomer, utilizing two polymerization stages. First stage polymerization is performed in a first agitation-reaction zone where the monomer is maintained between 200° F. and 260° F.; second stage polymerization is performed by moving the material through a second agitation-polymerization zone at higher pressure and lower temperature while exposing successive portions of the entire polymerizing mass to reduced vaporization pressures in an unobstructed flash vaporizing region.

---

This invention relates to processes for the production of polystyrene products, and particularly to the continuous mass polymerization of styrene monomer to produce either general purpose or rubber modified polystyrenes.

Increasing demand for polystyrene plastic in household appliances, electronic devices, architectural and building materials, packaging and many consumer products has produced a growing need for an economical method for the production of polystyrenes in which reaction time and the cost of plant facilities and processing operations could all be minimized. The processes of this invention have been found highly advantageous, for low cost, high quality polystyrene products are produced by the continuous mass polymerization of styrene monomer, with minimum processing time and excellent control of all operating procedures.

Polystyrene is made by the polymerization of styrene monomer, employing either mass or bulk polymerization techniques, or solution, emulsion, or suspension polymerization of the styrene monomer suspended in water or dissolved in hydrocarbon solvents in the presence of other materials. Mass or bulk polymerization often presents serious materials handling problems, because of the self-sustaining exothermic character of the polymerization reaction, the high viscosity of the polystyrene produced, and the tendency toward the formation of clots or agglomerates, discontinuous regions of unusually high viscosity of temperature at particular portions of the reaction zone during the progress of the polymerization reaction.

Emulsion, solution and suspension polymerization processes permit more convenient handling of the reaction mass, but the resulting polystyrene products require considerably more purification and processing equipment than those produced by mass or bulk polymerization techniques.

The major disadvantage of bulk polymerization processes is the difficulty encountered, after adding heat to initiate the reaction, in effectively removing heat continuously after the reaction becomes exothermic and self-sustaining. This is complicated by the difficulty in monitoring and controlling the reaction temperature, because of the tendency for the reaction to "run away" after it starts, producing different temperatures, different molecular weights, different viscosities and different heat exchange characteristics in different regions of the reaction mass. The non-uniformly increasing viscosity of the polymerizing reaction mass causes increasing difficulty in agitation of the mass to avoid hot spots or agglomeration, further reducing the uniformity and purity of the resulting product.

By employing the Crawford & Russell high viscosity or "wiped-film" reactors of my Pat. 3,206,287 to maintain the reaction mass in continuous agitation and progressive movement through all reaction zones, the difficulties normally encountered in mass polymerization of styrene monomer can be minimized or entirely overcome. This is particularly true when the polymerization process is divided into two or more successive continuous stages in separate high viscosity "wiped-film" reactors.

The primary stage or stages of the polymerization occur in one or more temperature-control jacketed primary reactors, arranged either in series or in parallel, in which the reaction mass is stirred and agitated by a ribbon type or helical impeller urging the mass along a central draft tube extending substantially throughout the entire height of each primary reactor, and thence urging the reaction mass through one or more annular recirculation zones surrounding the central draft tube. Both the draft tube and each annular recirculation zone are preferably equipped with rotating wipers or scrapers, to provide similar wiped-film agitation or scraping of the reaction mass from the heat control surfaces as described in my Pat. 3,206,287.

It is extremely difficult to make a polystyrene product of high molecular weight at conversions above about 40 percent in conventional bulk polymerization processes, because excessive viscosities would necessitate high reaction temperatures. In the preferred processes of the present invention, with the excellent agitation and heat-exchange achieved by my primary reactors, conversion proceeds up to 60 percent of completion or more in the first stage, and the reaction mass has by that time advanced to the second stage, where unconverted styrene monomer is drastically and abruptly removed from the reaction mass by flash vaporization. This occurs when the continuously advancing reaction mass is introduced into the secondary stage, in one or more reactors of similar type, preferably maintained at a higher temperature, and at a pressure maintained at atmospheric or lower. Each secondary reactor has approximately the upper half of its internal volume open and unobstructed, and evacuated through a condenser by a pump. This provides space for flash vaporization of unconverted liquid monomer through the reduction of pressure inside the reactor, with ample volume to accommodate any resulting foam formation, occurring as liquid monomer vaporizes through the viscous reaction mass.

The jacketed, agitated primary reactors provide excellent control of temperature therein, while the combination of the control of temperature and pressure in the jacketed secondary reactor permits careful selection of the molecular weight and molecular weight distribution in the resulting polystyrene product.

Removal of unconverted liquid styrene monomer by vaporization in the secondary stage in separate secondary reactors or "flash vaporizers" allows this material to be returned for recycling to the primary reactor, since it is of high purity, and leaves in the secondary reactor only the highly viscous molten polymerized reaction mass, substantially all polystyrene of the desired range of molecular weights. Small residual amounts of low molecular weight polystyrene and unreacted styrene monomer remaining in the material delivered from the secondary reactor to later stages of the process are largely removed in a devolatilizing extruder forming the third apparatus stage in the preferred processes of this invention.

The excellent temperature control and high heat transfer provided by the Crawford & Russell high viscosity or wiped-film reactors employed in the processes of this invention minimize chances of the development of "hot spots" which would diminish product quality. The efficient mixing occurring within these reactors insures product quality control and reproducibility.

Within working limits of catalyst concentrations and reaction temperatures, the molecular weight of the product tends to be reduced by increasing reaction temperatures and by increasing concentrations of catalyst. For any given reaction temperature increased concentrations of catalyst produce faster reaction rates, with corresponding faster exothermic heat generation rates. With the excellent heat-exchange characteristics of the wiped-film primary reactors, these faster reaction rates may be employed at any selected reaction temperature to reduce average residence time in the primary stage, without risk of "run-away" reactions. By balancing the factors of catalyst concentration, residence time and reaction temperature, optimum physical properties may be achieved in the final product, and high productivity per unit of primary reactor volume makes the processes of this invention economically attractive.

The relatively short residence time of the reaction mass in the secondary reactor serves to minimize degradation of the polystyrene product, and the highly efficient vaporization of unreacted monomer in the secondary reactor contributes significantly to precise control of molecular weight distribution and the achievement of high heat-distortion temperatures in the resulting polystyrene product. All of these advantages combine to produce high quality polystyrene at high production rates with precise control and good reproducibility of product quality.

Accordingly, the principal object of this invention is to provide processes for the economical continuous mass polymerization of styrene monomer to form high quality polystyrene products having molecular weights and molecular weight distribution ranges determined by close control of reaction pressures and temperatures during polymerization.

Another object of this invention is to provide continuous mass polymerization processes for converting styrene monomer into general purpose or high impact polystyrene products in continuously agitated reactors having excellent temperature control and heat transfer characteristics at high viscosities, providing effective control of product molecular weight distribution.

A further object of this invention is to provide continuous mass polymerization processes for conversion of styrene monomer into polystyrene products employing a primary reactor stage in which the reaction mass is continuously agitated and moved through temperature-controlled reaction zones in which up to sixty percent or more of the styrene monomer is polymerized, followed by introduction of the continuously-moving reaction mass into a secondary reactor stage where it is continuously agitated and moved through similar temperature-controlled reaction zones and simultaneously exposed to abruptly reduced pressure to achieve flash vaporization of unreacted monomer from the reaction mass, leaving a mass of substantially completely polymerized material for delivery to successive stages of treatment.

Other and more specific objects will be apparent from the features, elements, combinations and operating procedures disclosed in the following detailed description and shown in the drawings, in which:

FIG. 1 is a schematic flow diagram of the processes of this invention showing the separate primary and secondary reactor stages and associated units of apparatus;

FIGS. 2 and 3 are side elevation views of the primary reactor and the secondary reactor respectively, both shown partially broken away to reveal the details of their preferred internal construction;

FIG. 4 is a section top plan view, taken along line 4—4 in FIG. 2, showing the primary reactor heat control zones and agitator-scraper elements cooperating in the primary reactor shown in FIG. 2;

Figure 7:
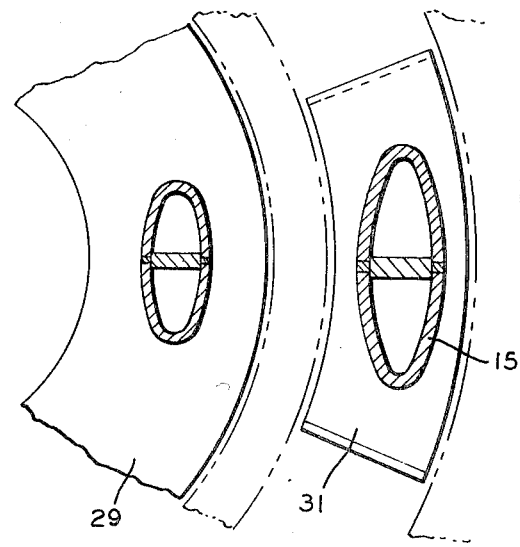
FIG. 7 is a top plan view of the agitator structure shown in FIG. 6.

As shown in the schematic flow diagram of FIG. 1, the starting material introduced to the continuous mass polymerization processes of this invention may be either pure liquid styrene monomer, which is to be polymerized to produce general purpose polystyrene, or a solution of styrene monomer with rubber such as polybutadiene, which is to be polymerized to produce a mixture of polystyrene with graft copolymers of rubber and styrene known as rubber modified or impact polystyrene. To this liquid styrene material there may be added a small amount of catalyst such as benzoyl peroxide and such other materials as initiators, promoters or lubricants designed to control the polymerization reaction or to improve the characteristics of the resulting product.

PRIMARY REACTOR STAGE

These materials are introduced into feed tank 10, where they may be stored under an oxygen-free atmosphere such as nitrogen gas at temperatures selected to minimize advance polymerization of the monomer which might produce polystyrene products of undesired low molecular weight. As required, fresh material is drawn from feed tank 10 through a pump 11 which delivers it to the top of one or several primary reactors 12, shown in FIGS. 1 and 2. Each reactor 12 is provided with an external heat exchange jacket 13 and a concentric inner, double-walled draft tube 14 through both of which heat exchange fluid is circulated. For example, steam, hot water or "Mobiltherm" oil may be used as the heat exchange fluid, directed through suitable heat exchangers to provide sensitive heat control of both the jacket 13 and draft tube 14 to maintain reaction temperature in primary reactor 12 within predetermined limits.

In order to initiate the reaction, the heat exchange fluid in jacket 13 and draft tube 14 may be maintained initially at a temperature considerably higher than that of the reaction mass. Once the continuous, exothermic polymerization reaction has begun, however, temperature within the primary reactor 12 rises rapidly. To avoid "run-away" reactions, and to provide precise control of the viscosity and of the rate and character of the reaction occurring in reactor 12, the heat exchange fluid in jacket 13 and draft tube 14 may be rapidly lowered in temperature to remove heat from the reaction mass and to maintain the reaction temperature within precisely determined limits. Primary reaction temperature can be successfully maintained within one or two degrees F. by this means.

By Pat. 3,206,287 fully explains the excellent heat exchange agitation of the reaction mass produced by the Crawford & Russell high viscosity or "wiped-film" reactors, which are provided with a ribbon stirrer or helical impeller 16 urging the reaction mass in a first direction along the length of draft tube 14, co-operating with agitators or scraper blades such as the blades 17 shown in FIGS. 2 and 4, pivotally mounted on an outer strut 15 rotating with impeller 16 at a slow rotational velocity, between ten and sixty r.p.m. for example, to provide thorough agitation for a portion of the reaction mass passing through the recirculation zone 19 between the outer wall of the draft tube 14 and the inner wall of jacket 13. Strut 15 and impeller 16 are both anchored to a diametric torque arm 20 rotated by a central drive shaft journalled in bearings in the reactor top plate. Similar wiper blades 18 are preferably mounted on the periphery of the impeller 16 to provide the same agitation along the inner wall of draft tube 14 in primary reactor 12 as shown in FIGS. 2 and 4. Blades 17 and 18 are all preferably pivoted to extend diagonally toward the adjacent heat exchange surface in the direction of their rotary advance, and they are urged into pivotal scraping contact with the adjacent heat exchange surface by the pressure of the reaction mass which they are agitating. Resulting scraping motion of the blades 17 and 18 through the reaction mass along the adjacent heat exchange surfaces tends to scrap or peel mass away from those surfaces and fold it radially into the adjoining regions of the reaction mass, producing swirls or eddies, resulting in excellent mixing and good heat exchange throughout the reaction mass. This swirling, eddying motion in radial directions is combined with the longitudinal advance of the reaction mass produced by the impeller 16 acting within the draft tube 14, driving the reaction mass ahead of it both through draft tube 14 and thence through the annular recirculation zone 19 swept out by blades 17.

SECONDARY REACTOR-FLASH VAPORIZATION STAGE

After complete circulation through draft tube 14 and annular space 19, the reaction mass in each primary reactor 12 is delivered at a predetermined rate through a central delivery port 21 located at the bottom of the reactor near the lower end of impeller 16, as shown in FIG. 2, and is drawn by a second pump 22 along suitable heat jacketed conduits 23 to be introduced preferably into the lower end of one or more secondary reactors 24, shown in FIGS. 1 and 3.

Substantially the upper half of each secondary reactor 24 is open, providing an empty internal flash zone 26 where the advancing reaction mass may be exposed to a reduced pressure or partial vacuum, causing flash vaporization of most of the unreacted monomer and removing this from the reaction mass, leaving principally the desired polystyrene reaction products having higher molecular weights. As shown in FIG. 3, the lower portion of secondary reactor 24 is provided with wiped-film agitation and impeller structure similar to that in each primary reactor 12, including an annular recirculation zone 25 inside an external heat exchange jacket 27 surrounding the entire outer wall of reactor 24 and extending throughout the length of this lower agitation zone, substantially the lower half of the reactor 24. Within this is positioned a concentric double-walled draft tube 28. A helical ribbon impeller 29 which may be provided with peripheral pivoted scraper blades 30 wipes the interior wall of draft tube 28, providing both inward radial agitation and longitudinal impelling movement driving the reaction mass forward longitudinally along the length of draft tube 28. Both draft tube 28 and recirculation zone 25 have their upper ends opening into the upper flash vaporization zone 26.

Figure 6:
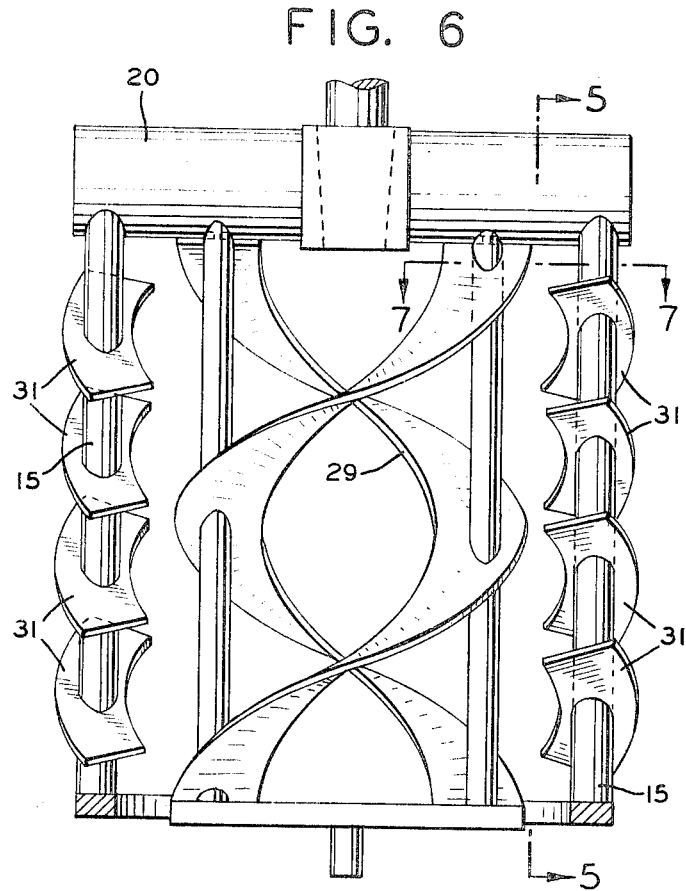
FIG. 6 is a side elevation view of a movable agitator structure supporting the agitator elements of FIG. 5, shown removed from a secondary reactor.
Figure 5:
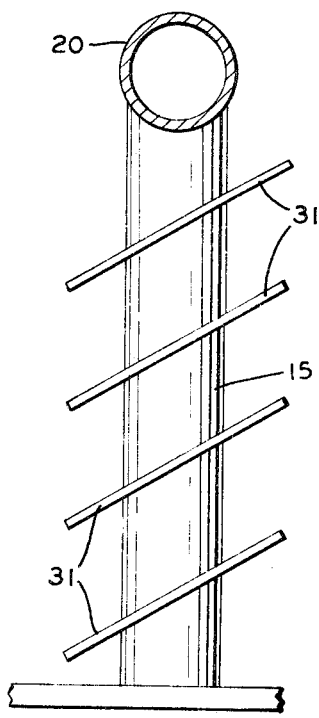
FIG. 5 is a radial elevation view, taken along line 5—5 in FIG. 6, showing a modified form of the wiped-film agitator elements employed in secondary reactors of this invention to agitate and move the reaction mass through the annular recirculation zone surrounding the internal draft tube.

In place of the recirculation zone wipers 17 shown in FIG. 2, several diagonal ramp plates 31 are shown in the secondary reactor 24 of FIG. 3, arrayed longitudinally along struts 15 within the annular space 25 between jacket 27 and draft tube 28 and mounted to be rotated as an integral unit with impeller 29. As shown in FIGS. 5–7, ramp plates 31 are preferably formed as short sector segments of a helical ribbon extending radially across the entire annular space 25 between jacket 27 and draft tube 28 of each secondary reactor 24. The outer and inner peripheral surfaces of ramp plates 31 thus pass very close to the adjacent heat exchange surfaces to provide excellent stirring agitation of the reaction mass and to promote its longitudinal advance through annular space 25.

As indicated in FIGS. 6 and 7, impeller wipers 30 may be omitted in secondary reactor 24, and if desired even ramp plates 31 may be omitted, leaving only impeller 16 and struts 15 to provide agitation and advancing recirculation movement to the reaction mass.

As partially polymerized material delivered by pump 22 from primary reactor 12 enters the lower end of secondary reactor 24, it is drawn by the rotary movement of ramp plates 31 upward through annular space 25 where further polymerization occurs, for the secondary reaction stage temperature is maintained between 400° and 550° F. by the heat exchange fluid passing through jacket 27 and draft tube 28. As the reaction mass moving upward through annular space 25 folds over the top of draft tube 28, to be drawn downward througn the center thereof by impeller 29, the reaction mass is exposed to the open, preferably evacuated flash zone 26, where flash vaporization removes most of the unpolymerized monomer. The amount of monomer remaining for polymerization is controlled by the degree of vacuum applied to the vessel, and some further polymeriaztion occurs as the remaining reaction mass is driven downwardly through draft tube 28 by the impeller 29 toward the lower delivery port 33.

After the flash vaporization occurring in flash zone 26, and the subsequent polymerization in draft tube 28, and after such recirculation as the residence time permits, the reaction mass drawn through delivery port 33 by a pump 34 is approximately 94 to 99 percent solids, or substantially completely converted into styrene polymers or graft copolymers of the desired range of molecular weights. This reaction product is driven by pump 34 through a suitable jacketed conduit 36 to a conventional devolatilizing extruder 37 having one or more vaporization zones exposed to vacuum, whereby further devolatilization of residual monomer and low molecular weight polymers is achieved. From extruder 37 the polystyrene product is delivered in spaghetti-like semi-solid strands 38 to be immersed in a cooling bath 39 to reduce its temperature after which it is passed through a conventional blower 41 to remove surface water and a pelletizer 40 from which it is delivered for packing and shipping as pellets suitable for later processing.

Flash zone 26 of secondary reactor 24 is exposed to vacuum by way of a condenser 42 in which the unreacted monomer drawn from the flash zone is cooled and condensed, to be collected in a receiver 43. The recovered styrene monomer from condenser 42 and receiver 43 is at least as good as the original feed in tank 10, as shown by comparative gas chromatographic analysis and polymerization tests performed on specimens of the styrene monomer from receiver 43 and compared with results of similar tests on the starting material introduced to feed tank 10. This recovered monomer can therefore be recycled and passed directly through feed tank 10 and primary reactor 12.

A second condenser 44 and second receiver 46 are connected to the devolatilizing extruder 37 for condensing residual styrene monomer and low molecular weight polymers vaporized in the extruder. Material collected in receiver 46 is preferably not recycled.

TABLE I.—General Purpose Polystyrene Production.—Examples

| | Run | | | | | |
|---|---|---|---|---|---|---|
| | C-2 | E-1 | E-2 | F-2 | G-2 | G-3 |
| Feed material | Fresh styrene | Fresh styrene | Fresh styrene | Fresh styrene | Fresh styrene | 100% recycled styrene |
| Benzoyl peroxide catalyst, lb./gal | $1.0 \times 10^{-4}$ | None | None | None | None | None |
| Primary reactor: | | | | | | |
| Operating temperature, °F | 223 | 245 | 244 | 240 | 243 | 244 |
| Operating pressure, p.s.i.a | 14.7 | 14.7 | 14.7 | 14.7 | 15.7 | 16.7 |
| Average residence time, hours | 11 | 7.2 | 7.2 | 7.1 | 7.7 | 7.5 |
| Average weight percent conversion, percent | 46 | 43–44 | 43–44 | 41.5 | 44.6 | 43.3 |
| M.W. range delivered | 138,000 | 117,000 | 115,000 | 118,000 | 115,000 | 108,000 |
| Secondary reactor: | | | | | | |
| Operating temperature, °F | 480 | 495 | 486 | 505 | 513 | 504 |
| Operating pressure, p.s.i.a | 14.7 | 14.7 | 7.8 | 3.1 | 3.1 | 3.7 |
| Average residence time, hours | 3.7 | 1.7 | 1.7 | 2.2 | 2.3 | 2.3 |
| Devolatilizing extruder: | | | | | | |
| Operating temperature, °F | 410–440 | 440–460 | 440–460 | 445–462 | 450–495 | 440–465 |
| Operating press, p.s.i.a | 0.95 | 1.47 | 1.47 | 1.47 | 1.47 | 1.47 |
| Product: | | | | | | |
| Solids, percent | 98 | 97 | 97 | 97.4 | 98.6 | 96.3 |
| Molecular weight (Staudinger) | 96,625 | 85,000 | 98,300 | 93,000 | 95,000 | 86,000 |

TABLE II.—General Purpose Polystyrene Production.—Physical Properties

| | Run | | | | | | Commercial general purpose polystyrenes |
|---|---|---|---|---|---|---|---|
| | C-2 | E-1 | E-2 | F-2 | G-2 | G-3 | |
| Molecular weight range (Staudinger) | 96,625 | 85,000 | 98,300 | 93,000 | 95,000 | 86,000 | 54,000–100,000 |
| Tensile strength, p.s.i | 5,496 | 6,750 | 8,076 | 8,160 | 7,950 | 7,185 | 4,300–9,000 |
| Tensile elongation at Failure, percent | 1.62 | 2.12 | 4.40 | 3.42 | 2.40 | | 0.9–3.0 |
| Modulus of elasticity ($\times 10^5$) | | 5.02 | 5.26 | 4.55 | 4.80 | 4.27 | 4.5–5.0 |
| Izod impact strength, ft. lb./in. notch | 0.37 | 0.86 | 0.96 | 0.82 | 1.32 | 0.74 | 0.2–0.7 |
| Heat deflection temperature at 264 p.s.i., °F | 165 | 173 | 182 | 196 | 192 | 185 | 165–200 |
| Residual Styrene, weight percent | 0.55 | 0.29 | 0.18 | 0.27 | 0.15 | 0.16 | 0.20–0.30 |
| Methanol soluble extractables, weight percent | 6.5 | 8.2 | 5.8 | | 1.02 | 3.54 | 5.7 |

TABLE III.—RUBBER MODIFIED POLYSTYRENE PRODUCTION.—EXAMPLES

| | Run | |
|---|---|---|
| | 1052-B2 | 1052-B4 |
| Feed Materials | Fresh styrene, plus 3% polybutadiene | Fresh styrene, plus 3% polybutadiene |
| Benzoyl Peroxide Catalyst, lb./gal | $9.2 \times 10^{-4}$ | None |
| Primary Reactor: | | |
| Operating Temp., °F | 229 | 252 |
| Average Pressure, p.s.i.a | 14.7 | 14.7 |
| Average Residence Time, hours | 10.0 | 8.5 |
| Average Percent Conversion | 39.0 | 46.0 |
| Secondary Reactor: | | |
| Operating Temp., °F | 455 | 444 |
| Average Pressure, p.s.i.a | 10.8 | 12.2 |
| Average Residence Time, hours | 3.1 | 2.4 |
| Devolatilizing Extruder: | | |
| Operating Temp., °F | 425–445 | 420–440 |
| Average Pressure, p.s.i.a | 1.47 | 1.47 |
| Product: Solids, Percent | 96 | 95.5 |

TABLE IV.—RUBBER MODIFIED POLYSTYRENE PRODUCTION.—PHYSICAL PROPERTIES

| | Run | | Commercial rubber modified polystyrenes |
|---|---|---|---|
| | 1052-B2 | 1052-B4 | |
| Tensile Strength, p.s.i | 5,780 | 5,905 | 2,500 to 6,700. |
| Modulus of Elasticity ($\times 10^5$) | 4.35 | 4.58 | 2.5 to 4.75. |
| Rockwell Hardness (L) | 84.2 | 87.5 | |
| Izod Impact Strength, ft. lb. per inch notch | 1.44 | 1.26 | 0.5 to 7.0. |
| Heat Deflection Temp., °F. at 264 p.s.i | 177 | 179 | 165 to 190. |
| Methanol Soluble Extractables, percent | 4.3 | 4.4 | 3.5 to 5.5. |

EXAMPLES OF POLYSTYRENE PRODUCTION RUNS

The advantages of the processes of this invention are confirmed by the results of an extended series of production runs whose operating conditions are summarized in Tables I and III. These production runs were performed in the pilot plant of Crawford & Russell Incorporated in Stamford, Conn. The primary reactor 12 was a 25-gallon stainless steel wiped-film reactor, incorporating a double-spiral screw impeller 16 of 1½ turns at 15" pitch operating in a full length draft tube 14, driven by a 3 H.P. motor at a standard speed of twenty r.p.m. The secondary reactor 24 was 10-gallon stainless steel wiped-film reactor incorporating a shorter double-spiral screw impeller 29 of 1½ turns at 11" pitch, driven by a 2 H.P. motor at a standard speed of twelve r.p.m., with the upper half of reactor 24 being open and unobstructed to form flash vaporizing zone 26. Devolatilizing extruder 37 was a Sterling extruder with a 1½" diameter screw driven by a 5 H.P. motor at speeds up to 125 r.p.m. Polystyrene-compatible carbon steel or stainless steel valves, pumps and piping were used to connect the processing units, since brass and copper cannot be used with polystyrene.

Table I shows the starting materials and the operating conditions maintained and observed in a series of six continuous mass polymerization production runs, each continuing over a period of several days, in which commercial quantities of general purpose polystyrene pellets were produced. The physical properties of the polystyrenes produced in each production run are tabulated in Table II and compared with those of comparable commercial general purpose polystyrenes. These properties were determined in the laboratory using the following analytical procedures.

Chromatograms of recycle and feed styrene were obtained under identical conditions using two different columns. Identical chromatograms for both styrenes were obtained on a given column. The chromatograms were obtained at various dilutions in methanol, and for the undiluted styrene, for seven different samples. It was thus concluded that the recycle styrene was apparently of the same purity as the feed.

Specimens of both feed and recycle styrene, kept eight hours in a water bath at 212° F. in the presence of 0.0182% benzoyl peroxide, analyzed as follows:

|  | Feed | Recycle |
|---|---|---|
| Solids, Percent | 25.24 | 32.53 |
| Molecular Weight | 112,000 | 116,000 |

The polystyrene content of both reactor and extruder products was determined by the universal gravimetric procedure: dissolution of sample in a solvent, precipitation in a large volume of methanol, filtration, drying of precipitate at 70° C., and weighing. The accuracy of the procedure is about ±0.3%.

Residual monomer in polystyrene pellets was determined chromatographically using a F&M Model 300 gas chromatograph. The procedure employed can give reproducibility and accuracy of about 15% and can detect a minimum of about ¼%. After dissolution in chloroform, the polystyrene was precipitated with a minimum amount of methanol, and the filtrate was chromatographed. Final calculations were made by consulting a graph relating peak area to monomer content. For greatest accuracy, standards were run with each determination.

Fractional precipitation at room temperature using methyl ethyl ketone/methanol as solvent/precipitant was used in the laboratory to separate a given specimen of polystyrene into a number of weight fractions, the molecular weight of each of which is then determined. From these data, the molecular weight distribution of the polymer sample is graphically constructed. The greater the number of fractions obtained from a given specimen, the more faithful the characterization. Thus far, preliminary results have been obtained for specimens separated into fourteen fractions. Specimens of a general purpose polystyrene available on the market were similarly characterized for comparative purposes.

The molecular weight of polystyrene is determined using an Ostwald viscometer to obtain the viscosity of a 10 percent polystyrene in toluene solution. The molecular weight of polystyrene is obtained from a curve relating 10 percent viscosity to molecular weight (Staudinger).

The runs E–1 and E–2 produced polystyrene equivalent to standard commercial "regular-flow" material. Run C–2 produced polystyrene equivalent to standard commercial "easy-flow" material.

Runs F–2, G–2 and G–3 were designed to produce heat resistant polystyrene, as indicated by the high heat deflection temperatures observed for the product of runs F–2 and G–2. In addition, run G–3 confirmed the purity of the recycle styrene monomer collected in receiver 43, for 100% recycle styrene was the feed material in run G–3 and polystyrene of high quality and excellent physical properties was produced.

As shown in Table II, the methanol soluble extractables, such as monomer, dimer, trimer, etc., were minimized in run G–2 having the highest operating temperature and the lowest operating pressure in the secondary or flash vaporizer stage. Attempts to operate at even higher secondary stage temperatures, to secure adequate devolatilization at higher secondary stage pressures, could be expected to result in significant product degradation.

As shown in Table III, in runs 1052–B2 and 1052–B4 the styrene monomer was mixed with 3% polybutadiene to produce "rubber modified" polystyrene. The conditions maintained and observed during these runs are summarized in Table III; the physical properties of the mixed polymer and graft copolymer products of these runs are summarized in Table IV.

Since Staudinger molecular weight figures are not considered meaningful for these rubber modified products, no attempt has been made to indicate their molecular weights. Intrinsic viscosity comparisons with standard commercial products indicate that rubber modified polystyrenes of good commercial quality and comparable physical properties were produced in runs 1052–B2 and 1052–B4.

In order to produce "high impact" polystyrene products, the feed material in feed tank 10 may contain a modifier, such as tertiary duodecyl mercaptan, to further control intrinsic viscosity.

In the processes of this invention, as shown in Tables I and III, substantially all of the polymer is made either catalytically or thermally in the primary reactor stage, where polymerization proceeds up to 60% or more of completion. Then the unreacted portion of the styrene monomer is rapidly removed, either at atmospheric pressure or preferably under reduced pressure in the flash vaporization zone 26, so that thermal polymerization of this unreacted styrene monomer is kept at a minimum. Such polymer formation in the secondary reactor stage is undesirable because it produces mainly a low molecular weight polymer, the proportion of which must be regulated in the final product if the latter is to have the desired properties.

The primary reactor is maintained preferably in the temperature range from 200–260° F., and preferably at atmospheric pressure. In the primary reactor 12, steam or hot water is preferably employed in place of hot oil as the heat exchange medium in jacket 13 and draft tube 14, and after the reaction is initiated these hollow heat exchange spaces may be filled with cooling water circulated to maintain the temperature of the exothermic reaction mass within the temperature range desired. As is indicated in the literature, the choice of optimum polymerization temperature depends on (1) the desired extent of conversion of monomer to polymer, (2) the nature of the catalyst initiator or promoter, (3) the concentration of catalyst initiator or promoter, and (4) the desired molecular weight average and molecular weight distribution.

In the primary reactor 12 the impeller preferably drives the reaction mass upward through the central draft tube 14 causing it to well over the top of the draft tube and then descend through the annular recirculation space 19 between jacket 13 and draft tube 14 as it travels toward delivery port 21. If desired, however, the direction of movement through the draft tube and annular space 19 may be reversed. In the secondary reactor 24, impeller 29 drives the reaction mass downward in draft tube 28, forcing the mass upward in annular recirculation space 25, to fold over the top of draft tube 28 for thorough exposure to flash vaporization zone 26, and repeated impeller-driven descent through draft tube 28.

This impeller-driven recirculation between adjacent heat exchange surfaces from which the reaction mass is wiped, folded and re-mixed continuously, as in the wiped-film reactors of FIGS. 2 and 3, provides the good heat exchange agitation employed to maintain effective temperature control of these continuous mass polymerization reactions. Scrapers 17, 18 and 30, or agitator structures employing only ribbon impellers 29 and struts 15, with or without ramp plates 31, may be employed to provide this heat exchange mixing of the reaction mass in reactors 12 and 24.

Residence time in the primary reactor 12 is adjusted to attain the desired percentage conversion by weight of monomer to polymer, which is normally up to 60 percent or more. The progress of the conversion is followed by measuring either viscosity or solids content of specimens of the reaction mass periodically withdrawn from the reactor.

In contrast to the primary reactor 12, the secondary reactor or flash vaporizer 24 having the flash vaporizing zone 26 is operated preferably at a higher temperature range, from 400–550° F., and at a lower pressure, preferably between atmospheric pressure and a substantial vacuum. These ranges of temperatures and pressures are selected to promote rapid flash vaporization of unreacted monomer from the reaction mass in secondary reactor 24. Heated oil or other conventional heat transfer fluids such as "Mobiltherm 600" or "Dowtherm A" may be used to provide the high temperatures in the heat exchange jacket 27 and draft tube 28 of secondary reactor 24.

In general, primary stage pressure is maintained at or above atmospheric pressure to retard vaporization and promote polymerization of monomer to the desired predetermined conversion percentage. By contrast, secondary stage pressure is usually kept below the primary stage pressure, and between atmospheric and a substantial vacuum, such as the 3.1 p.s.i.a. secondary pressure in runs F–2 and G–2, Table I, to promote vaporization and removal of unreacted monomer, leaving principally the polymerized material for delivery from delivery port 33 of secondary reactor 24.

While the objects of the invention are efficiently achieved by the preferred forms of the invention described in the foregoing specification, the invention also includes changes and variations falling within and between the definitions of the following claims.

I claim:
1. A process for continuous mass polymerization of a continuous stream of styrene monomer, comprising in combination the steps of
    (A) polymerizing the monomer in a first temperature-controlled polymerization zone bounded by first heat exchange surfaces which maintain the first zone at substantially atmospheric pressure and at a first polymerization temperature between 200° F. and 260° F. by
        (1) withdrawing heat by cooling the first heat exchange surfaces bounding the first polymerization zone to maintain the temperature of the polymerizing mass therein substantially constant while
        (2) continuously stirring and agitating the polymerizing mass to move it away from the immediate vicinity of the first heat exchange surfaces and into the adjacent body of the polymerizing mass in the first polymerization zone by compound eddy motion to promote optimum heat distribution throughout the polymerizing mass therein, and
        (3) continuously supplying unreacted styrene monomer to the first polymerization zone and continuously witdrawing partially polymerized material therefrom, and
    (B) continuously delivering the partially polymerized material withdrawn from the first polymerization zone to a second polymerization zone bounded by second heat exchange surfaces and maintained at a pressure below atmospheric pressure and at a second polymerization temperature higher than the temperature in the first polymerization zone to promote vaporization of volatile materials from the polymerizing mass in the second polymerization zone while
        (1) agitatingly moving the polymerizing material past the second heat exchange surfaces and
        (2) simultaneously stirring and agitating the polymerizing material to move it away from the immediate vicinity of the second heat exchange surfaces and into the adjacent body of the polymerizing mass in the second polymerization zone by compound eddy motion to promote optimum heat distribution throughout the polymerizing mass, and thereby
        (3) exposing successive portions of the entire polymerizing mass to the reduced vaporization pressures in an unobstructed flash vaporizing region of the second polymerization zone,
    (C) and continuously withdrawing material from the polymerizing mass in the second polymerization zone for subsequent devolatilization, cooling and delivery of the resulting polymerized solid product,
    (D) at least one of the first and second polymerization zones including a double-walled, cylindrical, open-ended heat exchange draft tube zone through which the polymerizing mass is driven into and through a recirculation space surrounding and communicating with both open ends of the draft tube zone for repeated passes through the draft tube zone.

2. The process defined in claim 1 wherein the second polymerization zone includes a flash vaporization zone of substantial unobstructed volume above the agitated polmerizing mass for separation of the partially polymerized material and the unpolymerized material vaporized therefrom, and withdrawing from the vaporization zone the volatile materials vaporized therein.

3. The process defined in claim 1 wherein the portion of the polymerizing mass continuously withdrawn from the second polymerization zone is passed through a devoltatilizing extruder where the subsequent devolatilization is performed.

4. The process defined in claim 1 wherein the draft tube zone and recirculation space form connecting, concentric regions in the first polymerization zone, with cylindrical heat exchange surface forming the outer boundary of the recirculation space, and with the bounding surfaces of the draft tube zone and the recirculation space being wiped to produce said compound eddy motion of the polymerizing mass.

5. The process defined in claim 1 wherein the temperature of the second polymerization zone is maintained between 400 and 550° F.

6. The process defined in claim 1 wherein unpolymerized material vaporized in the second polymerization zone is condensed and returned via a recycle conduit to be added to the fresh unpolymerized styrene monomer continuously supplied to the first polymerization zone.

References Cited

UNITED STATES PATENTS

| | | |
|---|---|---|
| 2,496,653 | 2/1950 | Allen et al. |
| 2,931,793 | 4/1960 | Melchore. |
| 3,206,287 | 9/1965 | Crawford. |
| 3,243,481 | 3/1966 | Ruffing et al. _____ 260—880 |

JAMES A. SEIDLECK, Primary Examiner

U.S. Cl. X.R.

23—260, 285; 260—95, 880